US006962959B2

(12) United States Patent
Kurano et al.

(10) Patent No.: US 6,962,959 B2
(45) Date of Patent: Nov. 8, 2005

(54) COMPOSITE ELECTROLYTE WITH CROSSLINKING AGENTS

(75) Inventors: Matthew Robert Kurano, Honolulu, HI (US); Gangadhar Panambur, Honolulu, HI (US); Arunachala Nadar Mada Kannan, Honolulu, HI (US); Karl Milton Taft, III, Honolulu, HI (US)

(73) Assignee: Hoku Scientific, Inc., Honolulu, HI (US)

( * ) Notice: Subject to any disclaimer, the term of this patent is extended or adjusted under 35 U.S.C. 154(b) by 76 days.

(21) Appl. No.: 10/653,016

(22) Filed: Aug. 28, 2003

(65) Prior Publication Data

US 2005/0048341 A1   Mar. 3, 2005

(51) Int. Cl.[7] .............................................. H01M 8/10
(52) U.S. Cl. ............................. 525/326.1; 525/328.4; 525/328.5; 429/30; 429/33; 521/27
(58) Field of Search .................. 429/30, 33; 521/27; 525/326.1, 328.4, 328.5

(56) References Cited

U.S. PATENT DOCUMENTS

| | | |
|---|---|---|
| 3,282,875 A | 11/1966 | Connolly et al. .......... 260/29.6 |
| 4,320,224 A | 3/1982 | Rose et al. ................. 528/125 |
| 4,330,654 A | 5/1982 | Ezzell et al. ............... 526/243 |
| 4,419,486 A | 12/1983 | Rose .......................... 525/534 |
| 4,625,000 A | 11/1986 | Chao et al. ................. 525/534 |
| 5,122,587 A | 6/1992 | Heinz et al. ................ 528/126 |
| 5,248,566 A | 9/1993 | Kumar et al. ................. 429/19 |
| 5,272,017 A | 12/1993 | Swathirajan et al. .......... 429/33 |
| 5,438,082 A | 8/1995 | Helmer-Metzmann et al. ......... 522/149 |
| 5,547,551 A | 8/1996 | Bahar et al. ................ 204/296 |
| 5,547,777 A | 8/1996 | Richards ...................... 429/32 |
| 5,599,614 A | 2/1997 | Bahar et al. ................ 442/171 |
| 5,635,041 A | 6/1997 | Bahar et al. ................ 204/282 |
| 5,716,727 A | 2/1998 | Savinell et al. ............... 429/33 |
| 5,766,787 A | 6/1998 | Watanabe et al. ............. 429/33 |
| 5,795,496 A | 8/1998 | Yen et al. ................... 252/62.2 |
| 5,942,347 A | 8/1999 | Koncar et al. ................ 429/30 |
| 5,958,354 A | 9/1999 | Thompson et al. ....... 423/328.1 |
| 6,042,958 A | 3/2000 | Denton et al. ................. 429/30 |
| 6,045,935 A | 4/2000 | Ketcham et al. .............. 429/30 |
| 6,059,943 A | 5/2000 | Murphy et al. ............. 204/296 |
| 6,090,895 A * | 7/2000 | Mao et al. ................ 525/330.9 |
| 6,096,449 A | 8/2000 | Fuglevand et al. ........... 429/13 |
| 6,099,988 A | 8/2000 | Savinell et al. ............. 429/189 |
| 6,248,469 B1 | 6/2001 | Formato et al. ............. 429/41 |
| 6,355,149 B1 | 3/2002 | Soczka-Guth et al. ...... 204/296 |
| 6,355,370 B2 | 3/2002 | Katoh et al. ................. 429/30 |
| 6,365,294 B1 | 4/2002 | Pintauro et al. .............. 429/33 |
| 6,387,230 B1 | 5/2002 | Murphy et al. ............. 204/296 |

(Continued)

OTHER PUBLICATIONS

Adjemian, K.T. et al.; "Silicon Oxide Nafion Composite Membranes for Proton-Exchange Membrane Fuel Cell Operation at 80-140° C.", Journal of the Electrochemical Society, 149(3) A256-A261 (2002).

(Continued)

*Primary Examiner*—William K. Cheung
(74) *Attorney, Agent, or Firm*—Ben Bedi; Dechert LLP

(57) ABSTRACT

A covalent crosslinking of ion-conducting materials via sulfonic acid groups can be applied to various low cost electrolyte membrane base materials for improved fuel cell performance metrics relative to such base material. This proposed approach is due, in part, to the observation that many aromatic and aliphatic polymer materials have significant potential as proton exchange membranes if a modification can increase their physical and chemical stabilities without sacrificing electrochemical performance or significantly increasing the material and production costs.

25 Claims, 11 Drawing Sheets

| | Mechanical Properties of Cross-linked Membranes | | | | | | |
|---|---|---|---|---|---|---|---|
| Ion-conducting base material | Cross-linking additive | Tensile (25C, 50% RH) | Tensile (70C, under water) | Modulus (25C) | Modulus (70C) | % Elog. (25C) | % Elog (70C under water) |
| 35% Sulfonated Poly Ether Ketone (sEK) | None | 2.3 | 1.6 | 38.0 | 35.0 | 49.0 | 81.0 |
| 35% sPEK | 1% PEK (5000amu) | 2.5 | 1.4 | 16.0 | 12.0 | 117.0 | 162.0 |
| 35% sPEK | 3% PEK (5000 amu) | 4.2 | 2.2 | 220.0 | 44.3 | 153.0 | 135.0 |
| 35% sPEK | 5% PEK (5000 amu) | 4.0 | 2.9 | 89.0 | 92.0 | 89.0 | 78.0 |
| | None | | | | | | |
| 35% sPEK | 1% PEK (3000 amu) | 3.8 | 2.4 | 149.0 | 55.8 | 124.0 | |
| 35% sPEK | 3% PEK (3000 amu) | | 2.2 | 128.0 | 89.5 | 123.5 | |
| 35% sPEK | 5% PEK (3000 amu) | 4.9 | 2.4 | 164.0 | 101.0 | 84.3 | 80.0 |
| | None | | | | | | |
| 35% sPEK | 1% sPEK (2500 amu, 20% Sulfonated) | 2.7 | 2.2 | 120.0 | 72.0 | 19.5 | 131.0 |
| 35% sPEK | 3% sPEK (2500 amu, 20% Sulfonated) | 2.6 | 1.7 | 60.3 | 43.0 | 28.0 | 81.0 |
| 35% sPEK | 5% sPEK (2500 amu, 20% Sulfonated) | 2.4 | 1.7 | 56.4 | 35.4 | 33.6 | 114.8 |

U.S. PATENT DOCUMENTS

| | | | |
|---|---|---|---|
| 6,387,556 B1 | 5/2002 | Fuglevand et al. | 429/22 |
| 6,509,441 B1 | 1/2003 | Kerres | 528/391 |
| 6,521,690 B1 | 2/2003 | Ross et al. | 524/445 |
| 6,523,699 B1 | 2/2003 | Akita et al. | 210/490 |
| 6,552,135 B2 | 4/2003 | Schnurnberger et al. | 525/536 |
| 6,576,100 B2 | 6/2003 | Arcella et al. | 204/296 |
| 6,630,265 B1 * | 10/2003 | Taft et al. | 429/33 |
| 6,706,834 B2 | 3/2004 | Wlassics et al. | 526/243 |
| 2002/0091225 A1 | 7/2002 | McGrath et al. | 528/170 |
| 2002/0094466 A1 | 7/2002 | Kerres et al. | 429/33 |
| 2003/0032739 A1 | 2/2003 | Kerres et al. | 525/535 |
| 2003/0059682 A1 | 3/2003 | Kerr et al. | 429/313 |
| 2003/0153700 A1 | 8/2003 | Wu et al. | 526/247 |
| 2004/0122178 A1 | 6/2004 | Huang et al. | 525/221 |

OTHER PUBLICATIONS

Aranda, Pilar et al.; "Poly(ethylene oxide)/$NH_4^+$-smectite nanocomposites"; Applied Clay Science 15 (1999) 119-135.

Chen, Hsien-Wei et al.; "The novel polymer electrolyte nanocomposite composed of poly(ethylene oxide), lithium triflate and mineral clay"; Polymer 42 (2001) 9763-9769.

Costamagna, P. et al., "Nafion 115/zirconium phosphate composite membranes for operation of PEMFCs above 100° C."; Electrochimica Acta 47 (2002) 1023-1033.

Costamagna, Paola et al.; "Quantum jumps in the PEMFC science and technology from the 1960s to the year 2000, Part I. Fundamental scientific aspects"; Journal of Power Sources 102 (2001) 242-252.

Costamagna, Paola et al.; "Quantum jumps in the PEMFC science and technology from the 1960s to the year 2000, Part II. Engineering, technology development and application aspects"; Journal of Power Sources 102 (2001) 253-269.

Jung, Doo Hwan et al.; "A performance evaluation of direct methanol fuel cell using impregnated tetraethyl-orthosilicate in cross-linked polymer membrane"; International Journal of Hydrogen Energy 26 (2001) 1263-1269.

Kaur, S. et al.; "Cross-linking of sulfonated styrene-ethylene/butylene-styrene triblock polymer via sulfonamide linkages"; Polymer 43 (2002) 5163-5167.

Kerres, J. et al.; "Application of Different Types of Polyaryl-Blend-Membranes in DMFC"; Journal of New Materials for Electrochemical Systems 5, 97-107 (2002).

Kerres, J. et al.; "Synthesis and characterization of polyaryl blend membranes having different composition, different covalent and /or ionical cross-linking density, and their application to DMFC"; Desalination 147 (2002) 173-178.

Kim, Yu Seung et al.; "Fabrication and characterization of heteropolyacid ($H_3PW_{12}O_{40}$)/directly polymerized sulfonated poly(arylene ether sulfone) copolymer composite membranes for higher temperature fuel cell applications"; Journal of Membrane Science 212 (2003) 263-282.

Kobayashi, T. et al.; "Proton-conducting polymers derived from poly(ether-etherketone) and poly(4-phenoxybenzoyl-1,4-phenylene)"; Soldi State Ionics 106 (1998) 219-225.

Liao, Bing et al.; "Polymer-layered silicate nanocomposites. 1. A study of poly(ethylene oxide)/$Na^+$—montmorillonite nanocomposites as fillers for reinforcement of polyethylene"; Polymer 42 (2001) 10007-10011.

Miyake, N. et al.; "Evaluation of a Sol-Gel Derived Nafion/Silica Hybrid Membrane for Polymer Electrolyte Membrane Fuel Cell Applications"; Journal of The Electrochemical Society, 148 (8) A905-A909 (2001).

Nunes, S.P. et al.; "Inorganic modification of proton conductive polymer membranes for direct methanol fuel cells"; Journal of Membrane Science 203 (2002) 215-225.

Park, Yong-il et al.; "Proton exchange nanocomposite membranes based on 3-glycidoxypropyltrimethoxysilane, silicotungstic acid and α-zirconium phosphate hydrate"; Solid State Ionics 145 (2001) 149-160.

Ruiz-Hitzky, Eduardo et al.; "Proton conductivity in Al-montmorillionite pillared clays"; Solid State Ionics 85 (1996) 313-317.

Shirai, Masamitsu et al.; "Photo-assisted thermal crosslinking of polymers having imino sulfonate units"; Reactive & Functional polymers 37 (1998) 147-154.

Staiti, P. et al.; "Hybrid Nafion-silica membranes doped with heteropolyacids for application in direct methanol fuel cells"; Solid State Ionics 145 (2001) 101-107.

Staiti, Pietro; "Proton conductive membranes based on silicotungstic acid/silica and polybenzimidazole"; Materials Letters 47 (2001) 241-246.

Szücs, Anna et al.; "Preparation and hydrogen sorption of Pd nanoparticles on $Al_2O_3$ pillared clays"; Colloids and Surfaces A: Physicochemical and Engineering Aspects 139 (1998) 109-118.

Tazi, B. et al.; "Parameters of PEM fuel-cells based on new membranes fabricated from Nafion, silicotungstic acid and thiophene"; Electrochimica Acta 45 (2000) 4329-4339.

Tchicaya-Bouckary, L. et al.; "Hybrid Polyaryletherketone Membranes for Fuel Cell Applications"; Fuel Cells 2002, 2, No. 1, 1-6.

Tsyurupa, M.P.; "Hypercrosslinked polymers: basic principle of preparing the new class of polymeric materials"; Reactive and Functional Polymers; vol. 53; Issues 2-3; Dec. 2002; 193-203.

Xiao, Guyu et al.; "Synthesis and characterization of novel sulfonated poly(arylene ether ketone)s derived from 4,4$^1$-sulfonyl-diphenol"; Polymer Bulletin 48, 309-315 (2002).

Yao, K.J. et al.; "Polymer/layered clay nanocomposites: 2 polyurethane nanocomposites" Polymer 43 (2002) 1017-1020.

Zaidi S.M.J., et al., "Proton conducting composite membranes from polyether ether ketone and heteropolyacids for fuel cell applications"; Journal of Membrane Science 173 (2000) 17-34.

Graves, R. et al.; "Polyphosphazene Membranes. II. Solid-State Photocrosslinking of Poly [(alkylphenoxy) (phenoxy) phosphazene] Films"; Journal of Applied Polymer Science, vol. 68. 827-836 (1998).

Kuver, A. et al.; "Comparative study of methanol crossover across electropolymerized and commercial proton exchange membrane electrolytes for the acid direct methanol fuel cell"; Electrochimica Acta. Vo. 43, Nos 16-17, pp. 2527-2535, 1998.

* cited by examiner

Mechanical Properties of Cross-linked Membranes

| Ion-conducting base material | Cross-linking additive | Tensile (25C, 50% RH) | Tensile (70C, under water) | Modulus (25C) | Modulus (70C) | % Elog. (25C) | % Elog (70C under water) |
|---|---|---|---|---|---|---|---|
| 35% Sulfonated Poly Ether Ketone (sEK) | None | 2.3 | 1.6 | 38.0 | 35.0 | 49.0 | 81.0 |
| 35% sPEK | 1% PEK (5000amu) | 2.5 | 1.4 | 16.0 | 12.0 | 117.0 | 162.0 |
| 35% sPEK | 3% PEK (5000 amu) | 4.2 | 2.2 | 220.0 | 44.3 | 153.0 | 135.0 |
| 35% sPEK | 5% PEK (5000 amu) | 4.0 | 2.9 | 89.0 | 92.0 | 89.0 | 78.0 |
| 35% sPEK | 1% PEK (3000 amu) | 2.9 | 2.1 | 69.0 | 26.0 | 155.8 | 124.0 |
| 35% sPEK | 3% PEK (3000 amu) | 3.7 | 2.7 | 112.9 | 39.5 | 140.1 | 123.5 |
| 35% sPEK | 5% PEK (3000 amu) | 4.3 | 2.4 | 157.0 | 101.9 | 132.1 | 116.0 |
| 35% sPEK | None | | | | | | |
| 35% sPEK | 1% sPEK (2500 amu, 20% Sulfonated) | 2.7 | 2.2 | 120.0 | 72.0 | 19.5 | 131.0 |
| 35% sPEK | 3% sPEK (2500 amu, 20% Sulfonated) | 2.6 | 1.7 | 60.3 | 43.0 | 28.0 | 81.0 |
| 35% sPEK | 5% sPEK (2500 amu, 20% Sulfonated) | 2.4 | 1.7 | 56.4 | 35.4 | 33.6 | 114.8 |

Fig. 1

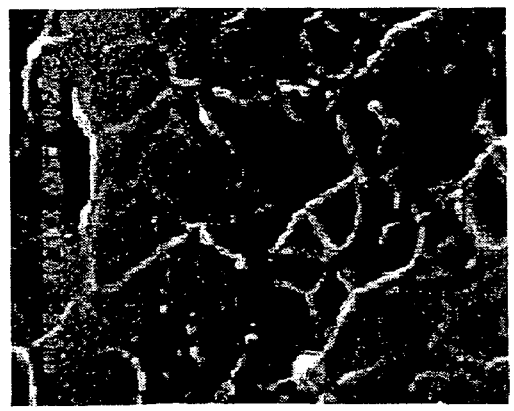
Picture-1: SEM Image of membrane cross-linked with a 5000 amu cross-linking agent (10.1K Mag.)
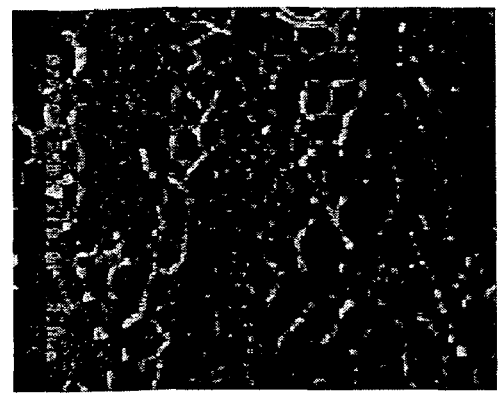
Picture-2: SEM image of membrane cross-linked with a 3000 amu cross-linking agent (10.1K Mag.)
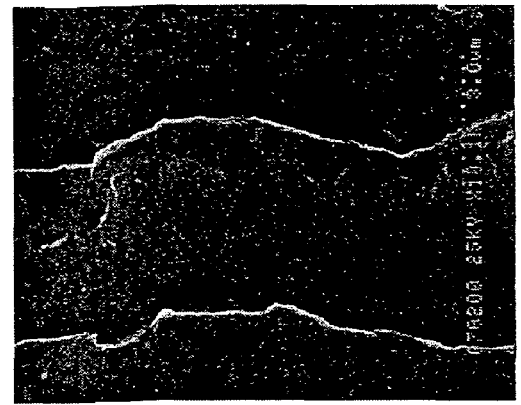
Picture-3: SEM image of membrane cross-linked with a 2500 amu Sulfonated cross-linking agent (10.1K Mag.)
Fig. 3

COMPOSITE ELECTROLYTE WITH CROSSLINKING AGENTS

FIELD OF THE INVENTION

The present invention relates to ionomers. More particularly, the present invention relates to proton exchange materials and methods for improving the physical and mechanical properties of ion-conducting materials.

BACKGROUND OF THE INVENTION

There is considerable demand for high performance, low cost, polymer electrolyte materials for use in hydrogen/oxygen and direct methanol fuel cell (DMFC) applications. Several polymer types have been used as proton exchange membranes including, but not limited to perfluorosulfonic acid, sulfonated aromatics, acidified imidazoles, and other organic/inorganic based composites. However, to date, no material has met all the requirements needed to enable fuel cells to become a viable commercial technology. High production costs, high methanol permeability, low physical strength, and/or poor electrochemical performance have plagued the various candidate materials and have hindered the emergence of a suitable material for wide spread use in fuel cell applications.

For the last 30 years, the industry standard proton conducting electrolyte membrane has been Nafion® (polyperfluoro sulfonic acid) produced by DuPont (U.S. Pat. Nos. 3,282,875 and 4,330,654). While the performance of Nafion® is moderately effective as a membrane within the context of hydrogen/oxygen PEM fuel cells, the polymer has a variety of limitations that have hampered the emergence of the proton exchange membrane (PEM) fuel cell design. Among these are Nafion's® high methanol permeability, low thermal stability, and its high cost.

Nafion® is the most commonly incorporated material in all low to medium temperature fuel cells although it works poorly as a direct methanol fuel cell (DMFC) membrane. Nafion's® poor performance within the DMFC context is primarily due to its high methanol permeability and resulting methanol crossover. To minimize crossover, some researchers have incorporated additives into Nafion® as described in US Patent Application No. 2002-0094466A1 as well as volatilized the methanol before introducing it to the anode side of the cell. However, incorporating additives does not mitigate Nafion's® high production cost and the volatilization of the methanol increases fuel cell system complexity.

Other perflourinated sulfonic acid materials have been developed to compete with Nafion®. One alternative membrane incorporates Nafion® or a Nafion®-like polymer into a porous polytetrafluoroethylene (TEFLON®) structure). These membranes are available under the trade name GORE-SELECT® from W. L. Gore & Associates, Inc. and they are described in U.S. Pat. Nos. 5,635,041, 5,547,551 and 5,599,614. Other similar membranes are available under the trade names ACIPLEX® from Asahi Chemical Co. and FLEMION® from Asahi Glass. Regardless of their developer, these alternative membranes exhibit many of the same deficiencies as Nafion®, namely, its high cost and high fuel crossover in DMFC applications.

To address the cost and performance limitations faced with the use of perflourinated sulfonic acid materials, recent research has focused on the development of acid functionalized aromatic polymers for use as proton exchange membranes in PEM fuel cells. Thermoplastics such as polysulfone-udel (PS-Udel) or poly-ether-ether ketone (PEEK) described in U.S. Pat. Nos. 4,625,000, 4,320,224 and 6,248,469 B1, have been extensively studied as ion-conducting materials as described by Tchicaya et. al, Xiao et. al, and U.S. Pat. No. 4,625,000, and U.S. Pat. App. US2002/0091225 (see: Tchicaya, L. *Hybrid Polyaryletherketone Membranes for Fuel Cell Applications*, Fuel Cells 2002, 2, No 1. and Xiao, G., *Synthesis and Characterization of Novel Sulfonated Poly(arylene ether ketone)s derived form 4,4'-sulfonyldiphenol*, Polymer Bulletin 48, 309–315 (2002)). Functionalizing these aromatic polymers has the potential of meeting the cost and production challenges that face the perfluorinated based polymers, but has two problematic properties for fuel cell operation: excessive osmotic swelling and low mechanical strength under hydrated conditions.

Aromatic based membranes, such as PEEK, which are described in U.S. Pat. Nos. 4,320,224, 4,419,486, 5,122,587 and 6,355,149 B1, use a post sulfonation process to attach sulfonic acid groups onto the polymer backbone. The frequency of sulfonation or other acid sites improves the electrochemical properties of the ionomer but also increases osmotic swelling and lowers the material's mechanical strength. While the increase in osmotic swelling can help to increase the conductivity of the material, an over hydrated material will become unsuitable for fuel cell applications.

Generally, all of the potentially low cost aromatic based polymers share the same challenges as sulfonated PEEK. Increasing sulfonation (or acid sites) increases the electrochemical performance of the membrane but decreases its mechanical properties after hydration. Many of the aromatic polymers such as the polyether sulfones and polymer aryl ketones as described in U.S. Pat. No. 4,625,000 from Union Carbide Corporation, have significant potential if their weaknesses can be overcome such that they can have high electrochemical properties while also retaining high mechanical properties.

One method that has been employed to overcome the shortcomings of acid functionalized proton exchange materials is to incorporate crosslinking agents. Kerres et al combined sulfinated ($-SO_2$) polymer chains with halogenated alkanes as described in U.S. Patent Appl. No. 2003/0032739 to reduce the osmotic swelling and improve the mechanical strength of the polymer. The reaction linked the sulfinated functional groups of polymer chains via a mid-length alkane, thereby reducing the osmotic swelling of the material. However, this process was experimentally complicated and reduced the proton conductivity of the proton exchange membrane product. Furthermore, the alkane (crosslinking agent) used to crosslink the material was devoid of functionality such as acid sites, and thereby could not add electrochemical performance characteristics to the material.

Another crosslinking strategy that has been implemented to improve fuel cell membrane performance entailed the copolymerization of styrene with divinylbenzene (see Tsyurupa M. P., *Hypercrosslinked Polymers: Basic Principle of Preparing the New Class of Polymeric Materials*, Reactive and Functional Polymers, Vol. 53, Issues 2–3, December 2002, 193–203.). In this method, the resulting crosslinked ionomer had limited oxidative resistance since both styrene and divinylbenzene display sensitivity to oxidation (Assink, R. A.; Arnold C.; Hollandsworth, R. P., J. Memb. Sci. 56, 143–151 (1993)). The crosslinking of the material did improve its performance characteristics though the base material was susceptible to chemical degradation and thus would limit membrane lifetime.

Accordingly, there is a need for improved proton exchange membrane materials with better physical and chemical properties that have good electrochemical performance such as proton conductivity.

SUMMARY OF THE INVENTION

The present invention is based upon the covalent crosslinking of ion-conducting materials via sulfonic acid groups which can be applied to alternative low cost membranes for improved fuel cell performance metrics over the base material. The invention is due, in part, to the observation that many aromatic and aliphatic polymer materials have significant potential as proton exchange membranes if a modification can increase their physical and chemical stabilities without sacrificing electrochemical performance or significantly increasing the material and production costs. More specifically, non-fluorinated polymer materials such as the aromatic poly ether ketones and poly ethersulfones show significant potential due to their low cost and high proton conductivity if the osmotic properties of the material and electrochemical performance can be optimized for use in PEMFCs. Other fluorinated materials such as the perfluorinated polymers can be improved if greater functionality and lower methanol permeability can be achieved (although cost is still a factor).

Crosslinking agents improve properties such as water uptake, methanol crossover, thermal stability and mechanical strength, without significantly decreasing the base material's positive attributes. The incorporation of functionalized crosslinking components or additives offers a promising technology for material modification for fuel cell applications.

Formation of a composite material in accordance with the present invention involves primarily (i) an ion-conducting base material, and (ii) a functionalized crosslinking component. Incorporation of the crosslinking agent with the base ion-exchange material improves the physical characteristics and potentially the overall performance of the ion-exchange material for use as a proton exchange membranes in fuel cells. Additionally, the crosslinking component allows for the addition of functional groups into base materials and can improve the physical and electrochemical performance of the resulting membranes for fuel cell use.

In one embodiment of the invention, an electrochemical fuel cell includes: (i) an anode; (ii) a cathode; (iii) fuel supply means for supplying fuel toward the anode; (iv) oxidant supply means for supplying an oxidant toward the cathode; (v) a polymer electrolyte as defined above that is positioned between the anode and cathode; and (vi) membrane electrode assembly (MEA).

In yet another embodiment of the invention, a method of fabricating a polymer membrane suitable for use in an electrochemical fuel cell includes (i) synthesizing a polymer material (of viscous nature) which contains (a) crosslinked polymer chains, (b) a fitting solvent which can dissolve the polymer material, (c) any or no inorganic additives, (ii) spreading the viscous liquid material to form a uniform thickness layer on the substrate; (iii) evaporating the solvent under controlled atmosphere from the viscous liquid to yield the polymer electrolyte membrane; and (iv) preparing the membrane for use in a fuel cell by acidification.

BRIEF DESCRIPTION OF THE FIGURES

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

FIG. 1 illustrates tensile strength and elongation values for sulfonated-polyether ketone (sEK) membranes with varying amount of crosslinking components.

FIG. 3 shows SEM photographs of crosslinked networks for sPEK based membranes.

DETAILED DESCRIPTION OF INVENTION

Figure 2:
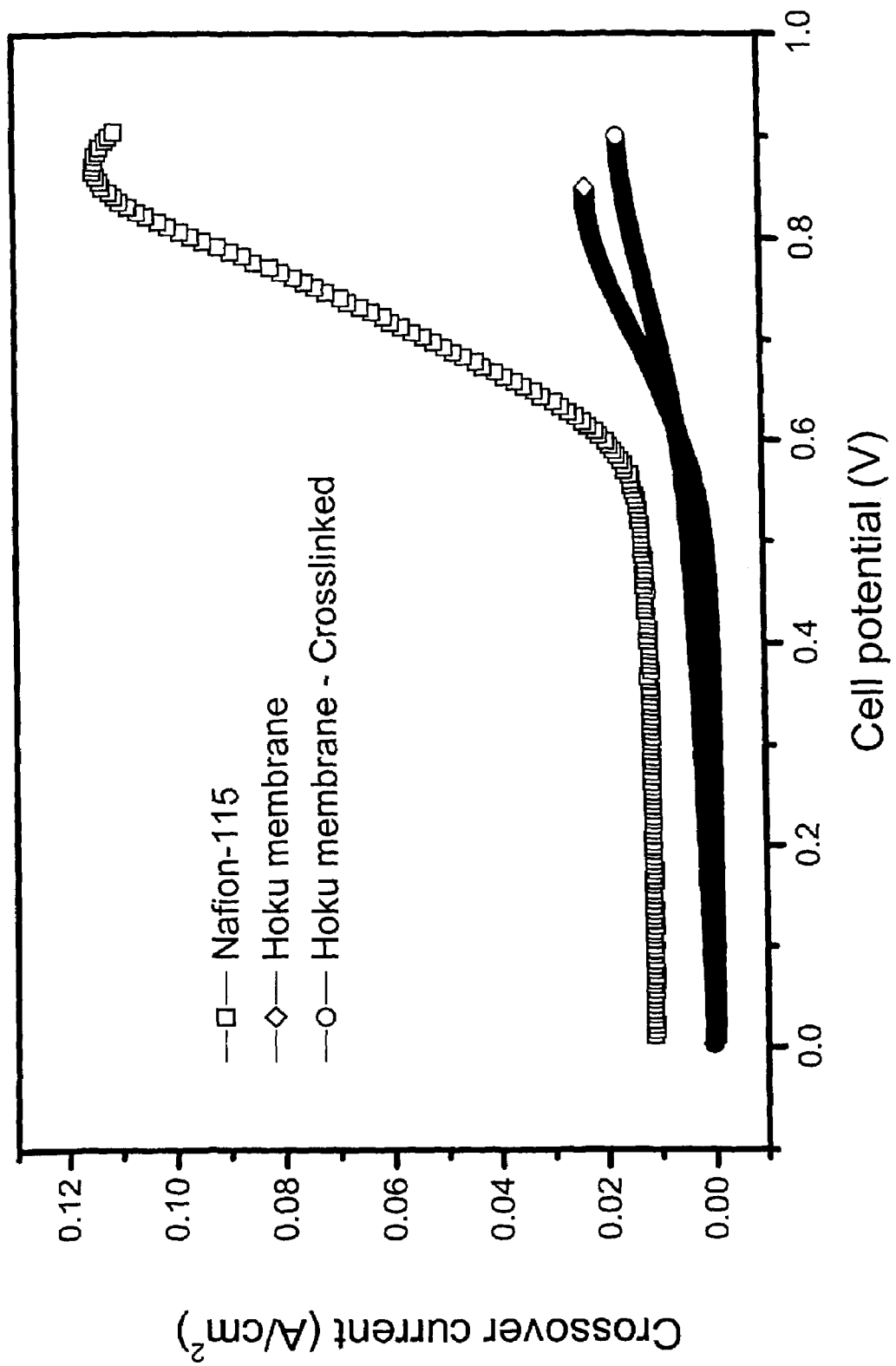
FIG. 2 shows graphs of methanol crossover current values for unmodified sulfonated polyether ketone (sEK) membranes, crosslinked sEK membranes w/a 5000 amu polyether ketone (EK) based crosslinking agent, and Nafion®-115.

The invention provides performance enhancing crosslinking agents, a method for their incorporation into ion-conducting materials, and their incorporation into a fuel cell as a high performance membrane material.

Forming an ion conducting material in accordance with the present invention involves primarily (i) a crosslinking additive or component, and (ii) a method for the incorporation of the crosslinking agent into an ion-conducting base material. Incorporation of the crosslinking agent with the base ion-exchange material improves the physical characteristics and potentially the overall performance of the ion-exchange material for use as a proton exchange material in fuel cells. Furthermore, the crosslinking component enables the easy tailoring of low cost ion-exchange base materials into higher performing ionomers.

The specifically designed crosslinking components may have various compositions; however, in order for the crosslinking additive and the base ion-conducting polymer to combine, one component must have a primary, secondary, or tertiary hydroxyl or amine group and the other component must have a primary, secondary, or tertiary, sulfonic acid group. These groups can be on the crosslinking component or the base ion-exchange component. The crosslinking agent's main chain may vary in length or structure, as well as composition and conformation. In addition, the crosslinking chain may include but is not limited to aromatic polymer chains, aliphatic polymer chains, organic/inorganic polymer networks, or any combination thereof. The crosslinking agents do not necessarily have to be polymeric in nature. Low molecular weight compound with same functionality may also be used.

The crosslinking agent may have independent functionality such as ion conducting groups or other chemical modifications such that the agent will introduce unique characteristics to the base material. Modifications may aid in improving mechanical, chemical, and/or electrochemical properties, or any combinations thereof. The crosslinking agent may have one or more amine, hydroxyl, or sulfonic acid groups present but must have at least one functional group which may react with the ion exchange base material's functional group to form the covalent crosslinking bond.

The ion-conducting base material may be of inorganic, organic, or of mixed constitution. Preferably, the ion-conducting material is organically based, of aromatic or aliphatic in composition, and may or may not contain structure stabilizing inorganic units. Possible aromatic structures include, but are not limited to poly-aryl ether ketones and poly-aryl ether sulfones where the polymer nature of the material has a molecular weight of at least 10,000 amu. Possible aliphatic materials include, but are not limited to perfluorinated or styrene co-polymer types. Generally, the preferred ion-conducting materials must have adequate molecular weights and/or polymer structures with functional groups that include, but are not limited to, sulfonic acids, phosphoric acids, carboxylic acids, imidazoles, amines, and amides. These groups help to increase the electrochemical functionality of the material. However, regardless of the many functional groups possible, the ion-conducting base material must contain amine, hydroxyl, or sulfonic acid groups so that the material may be crosslinked effectively with the crosslinking components by the method disclosed.

The reaction scheme in EQUATION 1 is a generalization of the direct covalent crosslinking method between a hydroxyl terminated crosslinking agent and a sulfonated base ion-conducting material.

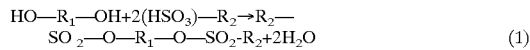
(1)

$R_1$ is the crosslinking component's main chain including but not limited to aromatic polymer chains, aliphatic polymer chains, and organic/inorganic molecules. $R_2$ is any base material which can be sulfonated and includes, but is not limited to, aromatic polymer chains, aliphatic polymer chains, and organic/inorganic molecules and structures. The functional group on the crosslinking agent may appear at the chain end or anywhere in the backbone. Incorporation of the crosslinking component with the ion-conducting base material takes place in a non-aqueous environment. The presence of water can limit the extent of the reaction. Furthermore, the reaction temperature, duration, and component concentrations all affect the degree of crosslinking, as well as the dynamic nature of the reaction composition.

The reaction between an amine terminated crosslinking agent and ion-conducting base material is generalized in the reaction equation below:

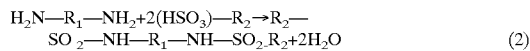
(2)

EQUATION 2 is a generalization for the direct covalent crosslinking method between an aminated crosslinking agent and a sulfonated base material. $R_1$ and $R_2$ represent the same materials as listed in EQUATION 1.

Furthermore, the reaction may take place with the sulfonic acid groups on the crosslinking additive and the amine or hydroxyl group on the ion-conducting base material. These reactions are generalized in EQUATION 3 and EQUATION 4 below.

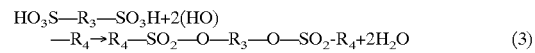
(3)

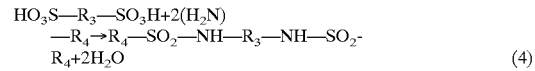
(4)

Here, $R_3$ is the crosslinking component's main chain including but not limited to aromatic polymer chains, aliphatic polymer chains, and organic/inorganic molecules. $R_4$ is any base material which can be sulfonated and includes, but is not limited to, aromatic polymer chains, aliphatic polymer chains, and organic/inorganic molecules and structures.

The reaction solvent used in all reaction schemes includes but is not limited to high boiling point, non-polar solvents such as dimethyl sulfoxide (DMSO), n-methyl pyrrolidinone (NMP), dimethyl acetamide(DMAC) or dimethylformamide (DMF). The reaction may proceed under azeotrophic distillation via the removal of water by toluene to facilitate the reaction kinetics. Reaction times vary depending on the conditions used but typically range from 1 to 12 hours and more preferably from 3–10 hours. If the crosslinking additives are amine or hydroxyl functionalized, the reaction mixture may consist of 0.1% to 100% crosslinking component molar equivalents with respect to the base polymer's sulfonic acid sites, but preferably between 0.1 and 8%. If the crosslinking additives are sulfonic acid functionalized, the reaction mixture may consist of 0.1% to 100% crosslinking component molar equivalents with respect to the base polymer's amine or hydroxyl groups, but preferably between 0.1% and 8%

The crosslinking components disclosed improve the tensile strength of the base material in both wet and dry conditions. This is primarily due to the increase in molecular weight and reinforcing linkages between adjacent polymer chains. Furthermore, the inherent nature of the crosslinking agent imparts either hydrophobic or hydrophilic regions affecting the overall hydrodynamic nature of the resulting material. The use of particular crosslinking agents of varying molecular weight allows for tuning the elongation of the material without sacrificing tensile strength.

In polymer chains, where the elongation of the material is directly dependent on the coiling and orientation of the material before sheering, covalent crosslinking affects the material's ability to elongate. Longer crosslinking agents increase the elongation of the material while not sacrificing the materials tensile strength. The table in FIG. 1 highlights this phenomenon. The crosslinked network formed by the covalent crosslinking through sulfonic acid groups enables a significant level of control of the physical properties of the base material. The improvements in tensile strength, Young's modulus, and elongation at break are direct results of the incorporation of the crosslinking agents into the base material. As seen in FIG. 1, generally, the elongation of the material increases as the length of the crosslinking agent increases; while tensile strength increases as the percentage of crosslinking agent increases.

In addition, crosslinking components may impart microstructure changes to the base ion-conducting material, thereby limiting the resulting material's permeability. With the ion-conducting channel size reduced, the methanol permeability of the material also lessens. Reducing the methanol permeability of proton exchange membranes is critical to improving the performance of direct methanol fuel cells (DMFCs). FIG. 2 shows the reduction in methanol crossover that the crosslinking components add to the base ion-conducting polymer. Incorporation of the crosslinking agent reduces methanol crossover by 30% when normalized for thickness and polymer type.

The microstructure network formed by the covalent crosslinking of the material is visible as shown by the scanning electron micrographs in FIG. 3. The scanning electron micrographs show a base ion-conducting material crosslinked with various crosslinking agents. The size of the web-like network visible between the micrographs correlates to the differences of the crosslinking agents. This visible difference in microstructure is apparent and correlates with the increase in all physical properties of the membrane. Other properties such as water uptake of the material can also be manipulated with control over the covalent crosslinking as well as the structure and amount of crosslinking agent.

Figure 4:
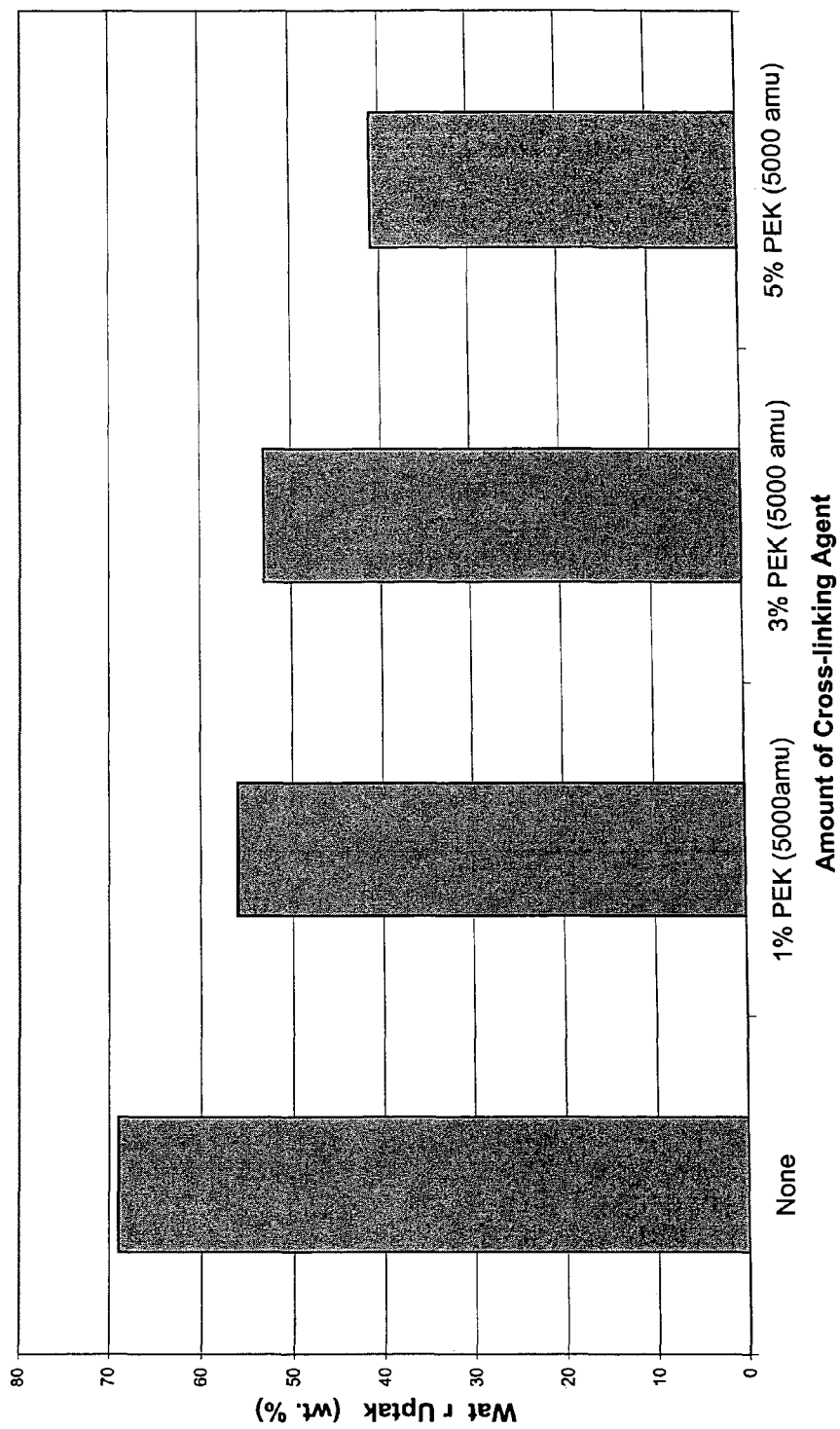
FIG. 4 shows bar graphs of water uptake values of sPEK membranes with various crosslinking percentages (5000 amu non-sulfonated PEK crosslinking additive).
Figure 5:
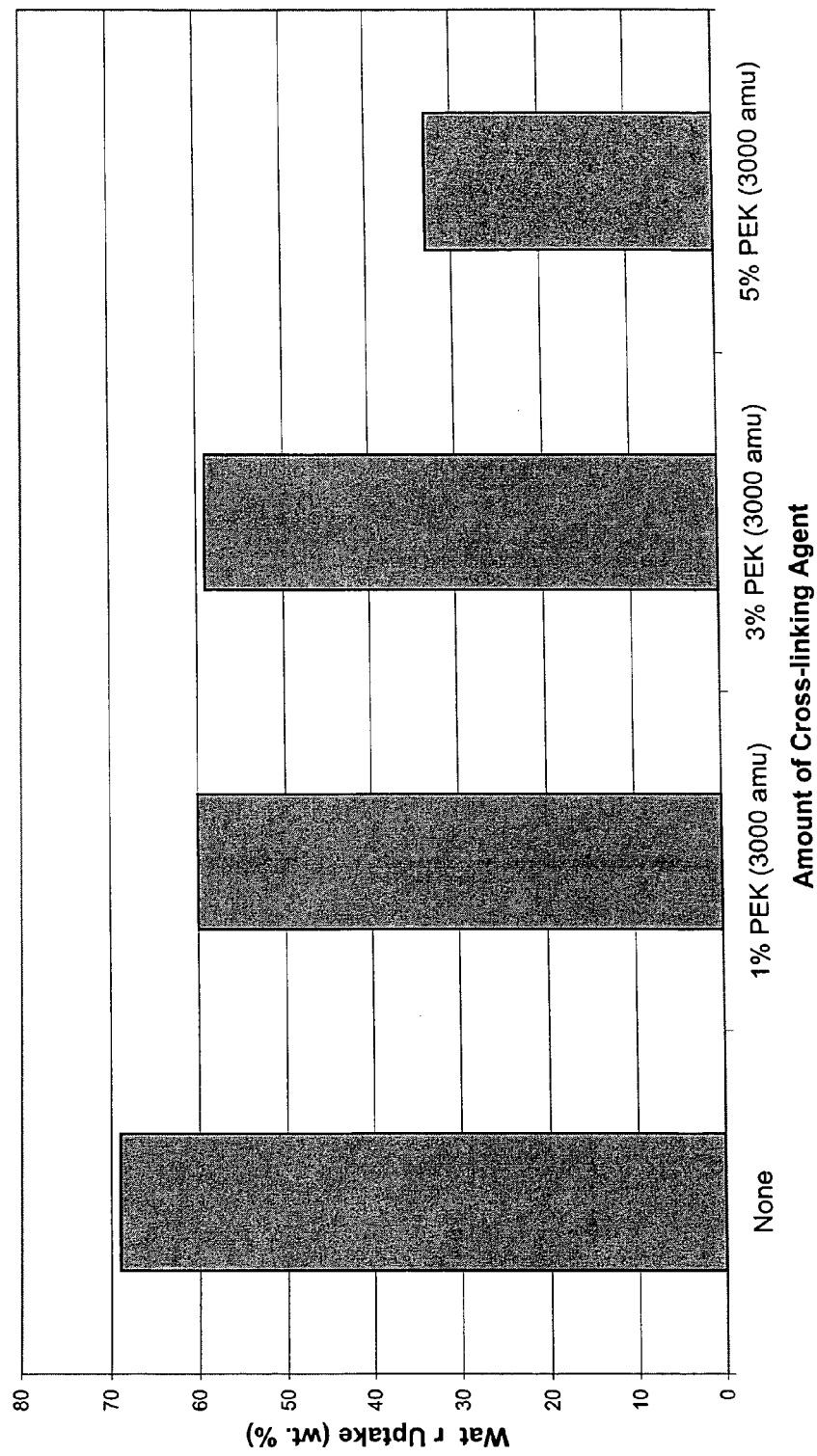
FIG. 5 shows bar graphs of water uptake values of sPEK membranes with various crosslinking additive percentages (3000 amu non-sulfonated PEK crosslinking additive).
Figure 6:
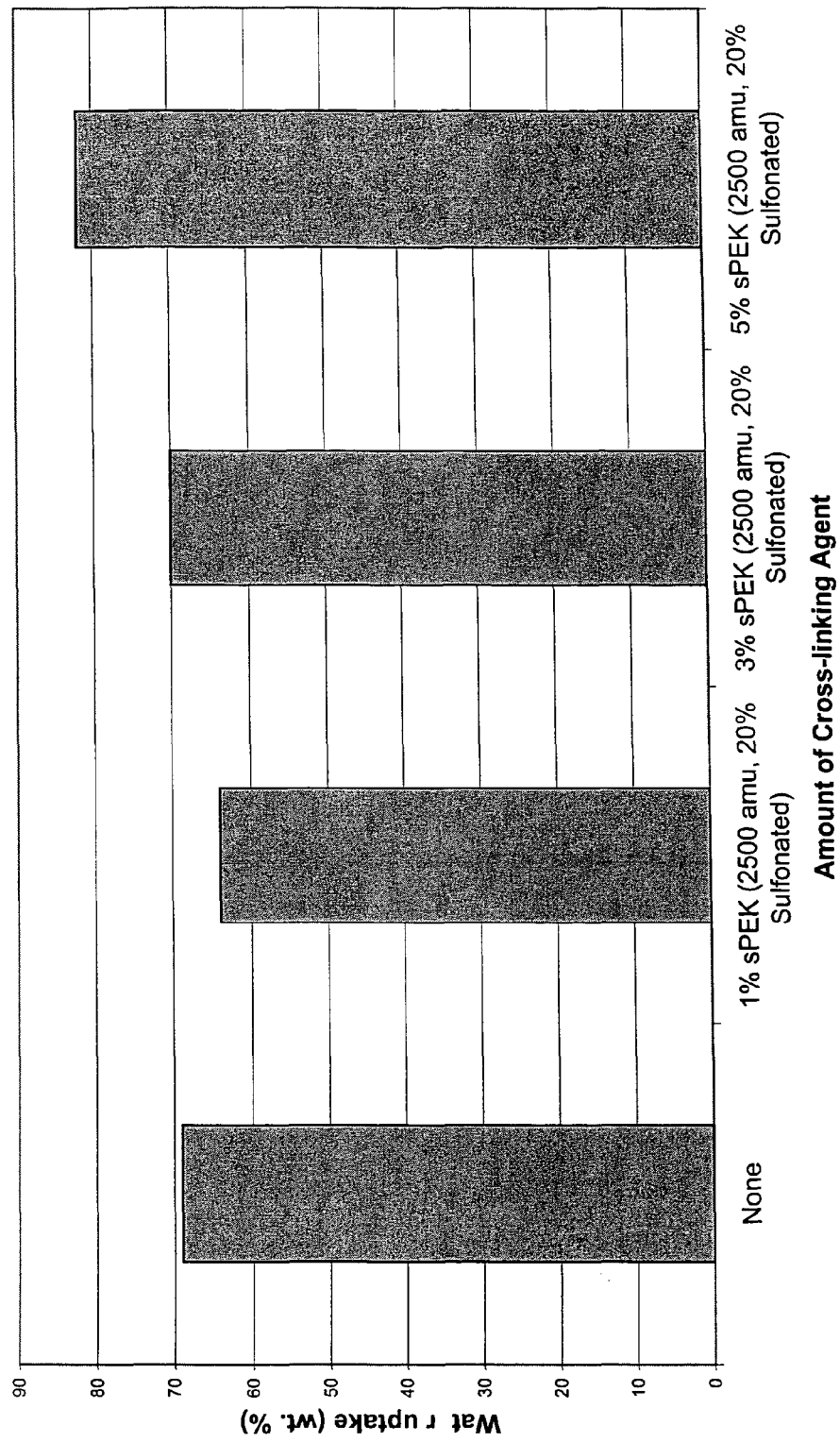
FIG. 6 shows bar graphs of water uptake values of sPEK membranes with various sulfonated crosslinking additive percentages (2500 amu sulfonated PEK crosslinking additive).

Base ion-conducting materials may have inherent water uptake properties that are either too high or too low for their objective purposes. Too high of a water uptake may cause the weakening of the materials physical properties, while too low of a water uptake may limit the ion-conducting material's ability to conduct protons at a high efficiency. Water balance of the membrane is critical for high fuel cell performance. To tailor the material for usage, the covalent crosslinking can act as an ideal modifier for a polymer electrolyte membrane. As seen in FIGS. 4–6, the incorporation of the crosslinking component into the base material can increase or decrease the water uptake of the base ion-conducting material.

As mentioned previously, many of the inexpensive acid functionalized aromatic polymers with potential as proton exchange membranes in fuel cells excessively swell in the presence of water due to their hydrophilic nature. This excessive osmotic swelling limits their use as ionomers in fuel cells. Previous work by Kerres et al. showed that these materials could be crosslinked, improving osmotic swelling, but the resulting material had low proton conductivity (see: U.S. Patent Application No. 2003/0032739). The crosslinking components disclosed in the present invention may embody functional groups such as sulfonic acid that can minimize electrochemical performance losses such as proton conductivity as well as augment the oxidative resistance of the material.

Figure 9:
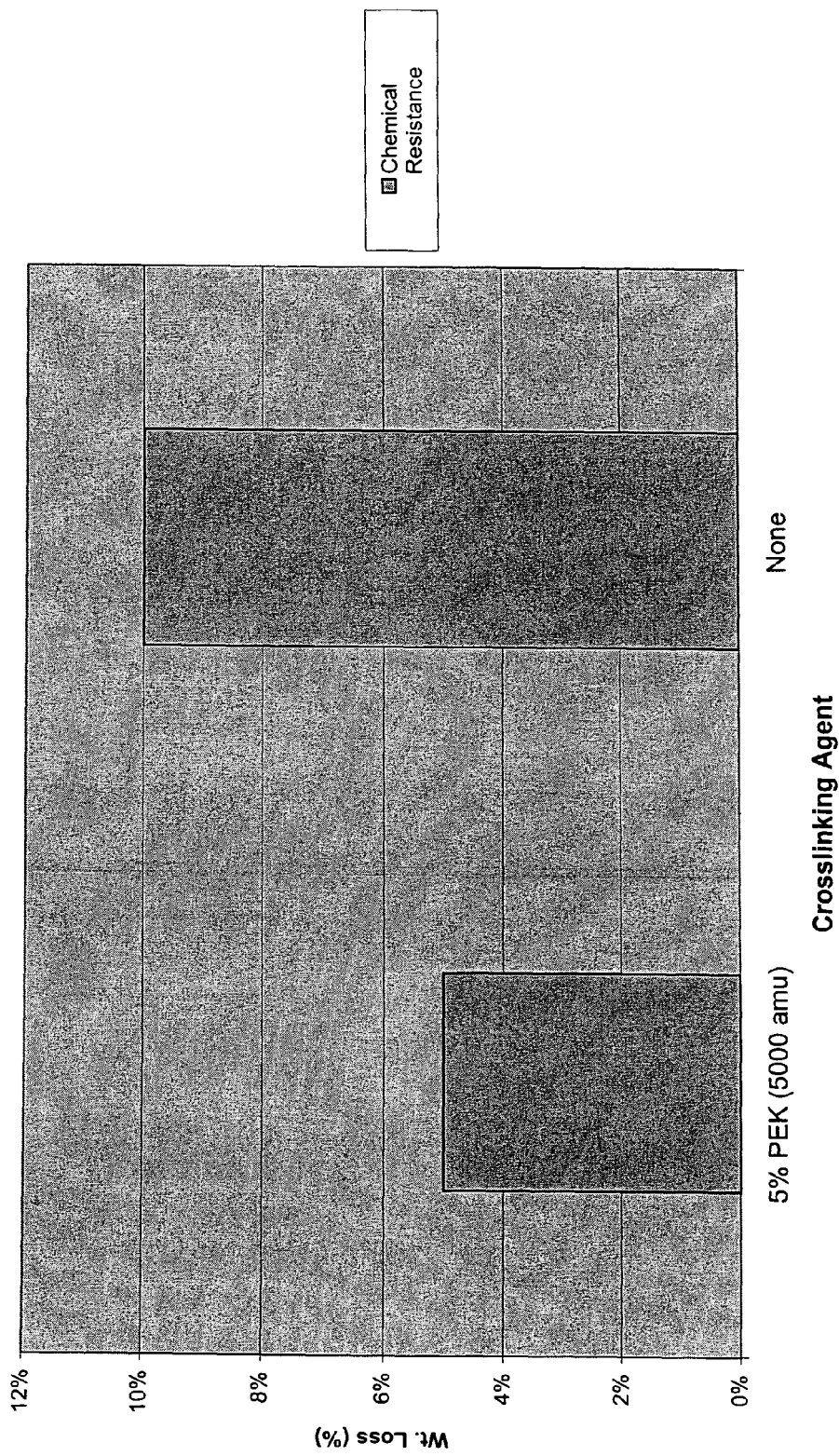
FIG. 9 shows bar graphs of oxidation resistance values for unmodified sPEK and crosslinked sPEK.

The material life of a membrane in fuel cell use is largely dependant on the stability of the material in the operationally oxidative atmosphere. Unmodified (non-crosslinked) polymer materials with functional groups directly bonded to the chemical backbone may be susceptible to greater degrees of oxidation than other materials which have the functional groups removed from their primary backbones. In some cases, the crosslinking agents disclosed may increase the chemical stability of the material. As seen in FIG. 9, the stability of the base material in a highly oxidative atmosphere is lower than the stability of the base material incorporated with a crosslinking agent. The base material alone shows a loss of 10% of its weight after 4 hours in a solution of 3% $H_2O_2$ and 0.4 M iron sulfate, while the base material incorporated with the crosslinking agent shows only a loss of 5%. As is apparent, the incorporation of the performance enhancing crosslinking agents improve the material in many aspects.

Figure 7:
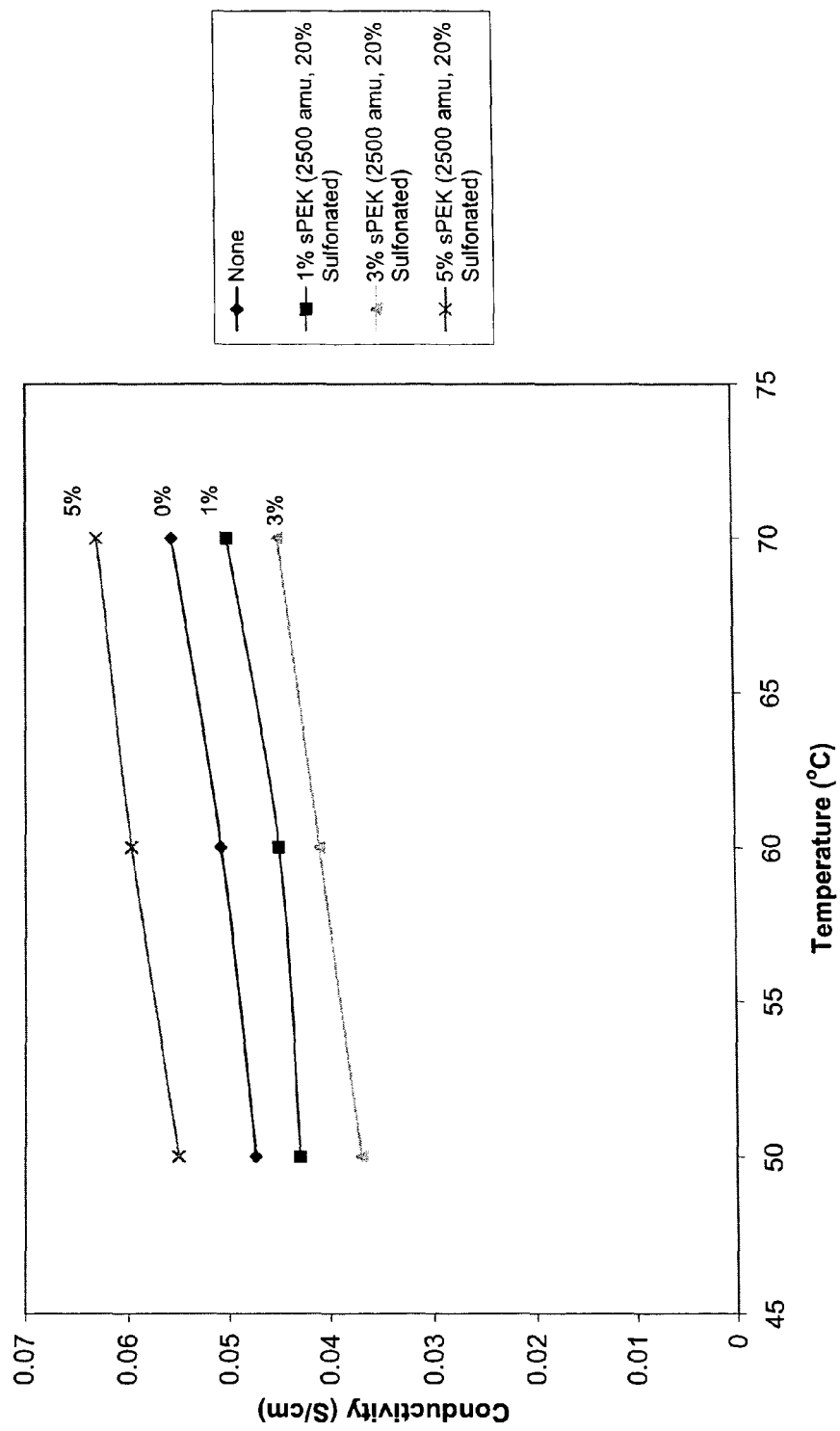
FIG. 7 shows graphs of proton conductivity values for sPEK membranes with varying amount of crosslinking components (2500 amu sulfonated PEK crosslinking additive)
Figure 8:
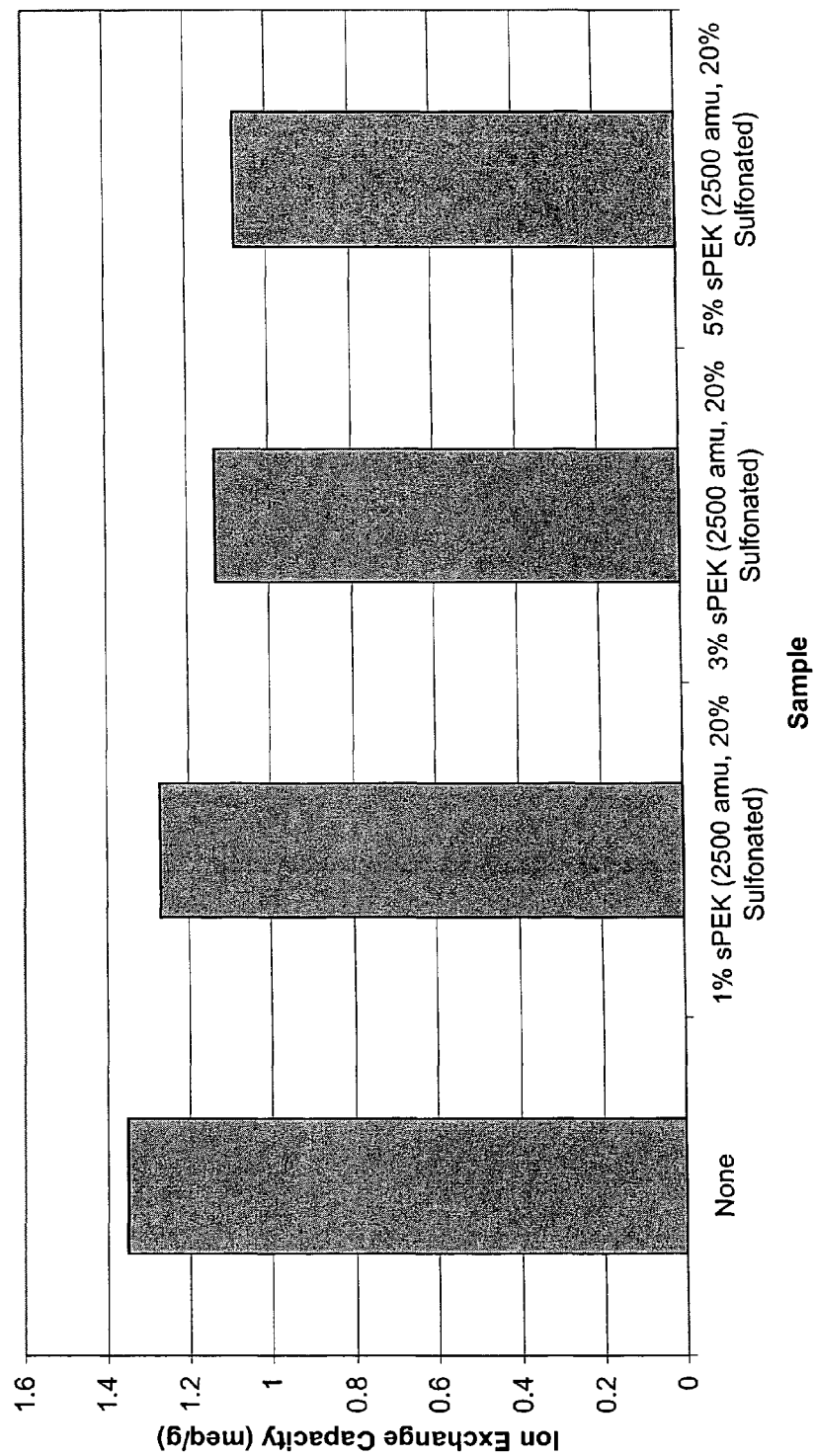
FIG. 8 shows bar graphs of ion exchange capacity (IEC) values for unmodified sPEK membranes with varying amount of crosslinking components (2500 amu sulfonated PEK crosslinking additive)

FIGS. 6–8 highlight the effect of the present invention on an acid functionalized aromatic poly ether polymer (35% sPEK). In some cases, the incorporation of the sulfonated crosslinking agent helps to reduce osmotic swelling without reducing the proton conductivity significantly. This result can be extremely useful in improving the characteristics of acid functionalized aromatic polymers for use in fuel cells. Furthermore, FIGS. 7 and 8 indicate the inconsistencies of IEC and proton conductivity results. As the amount of crosslinking component is increased, the IEC of the resultant polymer decreases. This result was anticipated as the amount of sulfonic acid sites for the resultant makeup decreased by one for every crosslinking additive which was incorporated. This decrease was consistent with what was observed in FIG. 8. However, for the same materials the proton conductivity actually increased between the 3% and 5% crosslinking agent samples. This result was unexpected and can most likely be attributed to the microstructure change of the resultant material after the crosslinking additive was incorporated. The ability of the present invention to alter the microstructure in a manner where conductivity increases while IEC decreases suggests that there is significant potential to modify acid functionalized aromatic polymers and others in a fashion suitable for use as proton exchange membranes. The performance enhancing crosslinking agents significantly change the properties of base material as well as enable the tailoring of the material for specific uses.

Figure 10:
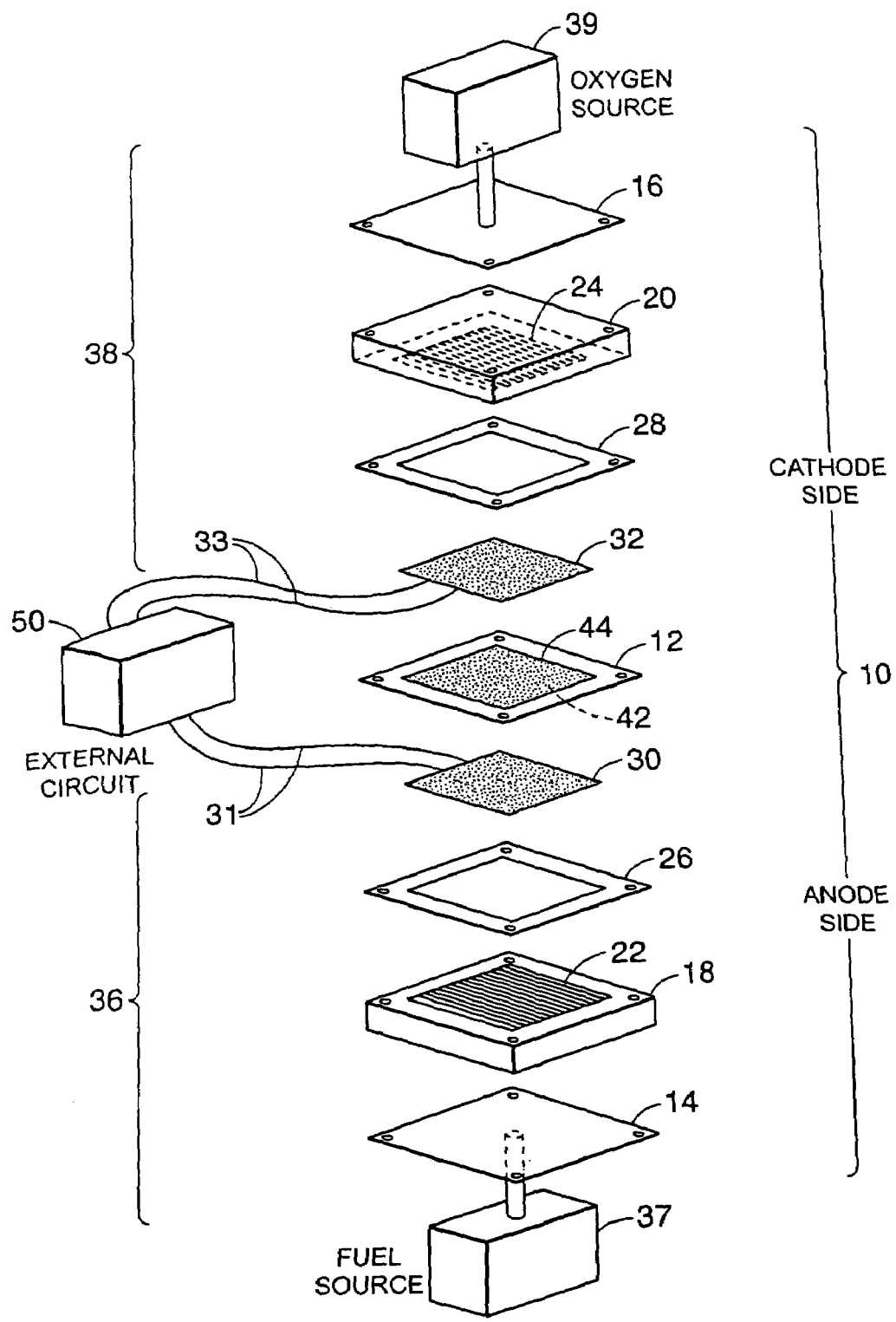
FIG. 10 illustrates a disassembled fuel cell.
Figure 11:
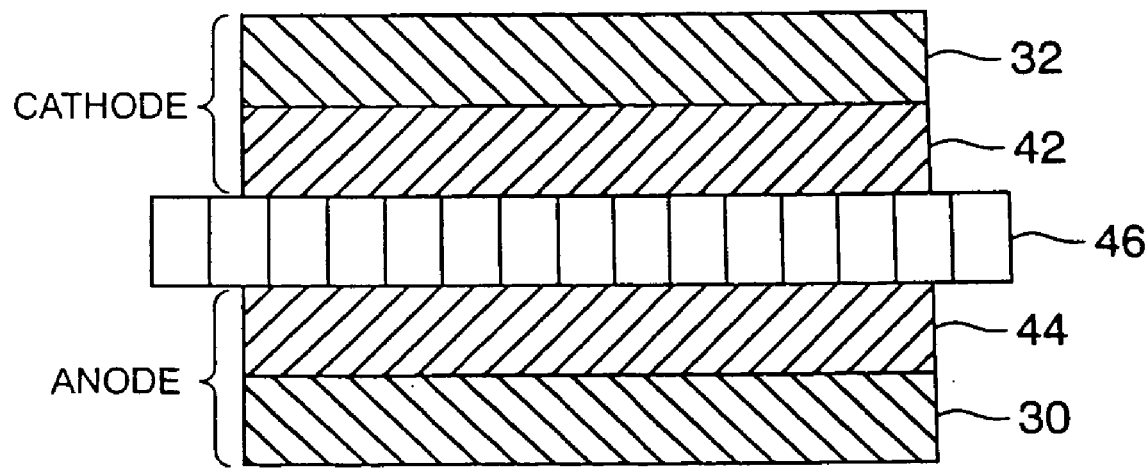
FIG. 11 illustrates a partial cross sectional view of a single electrochemical fuel cell.
Figure 12:
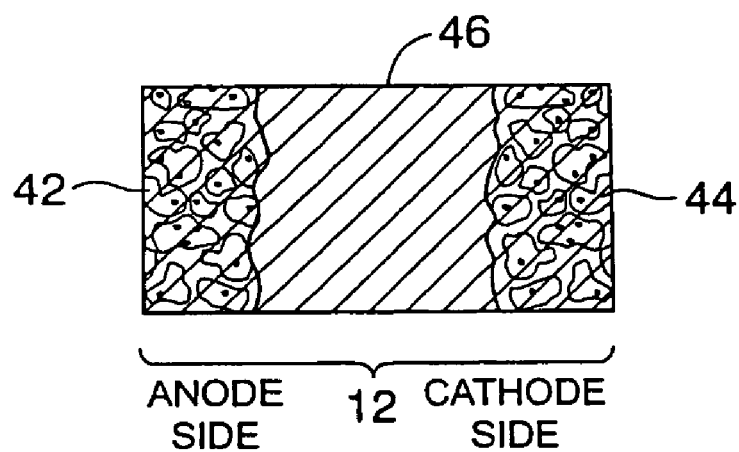
FIG. 12 illustrates a partial cross sectional view of a membrane electrode assembly.

The covalently crosslinked electrolyte of the present invention is particularly suited for use as the proton exchange membrane in an electrochemical fuel cell that is illustrated in FIGS. 10, 11, and 12. The electrochemical cell 10 generally includes a membrane electrode assembly 12 flanked by the anode and cathode flow field structures. On the anode side, the cell includes an endplate 14, graphite block or bipolar plate 18 with openings 22 to facilitate gas distribution, gasket 26, and anode carbon cloth current collector 30. Conversely, on the cathode side, the cell includes stainless steel endplate 16, graphite block or bipolar plate 20 with openings 24 to facilitate gas distribution, gasket 28, and cathode carbon cloth current collector 32. The carbon cloth material is a porous conductive support for the diffusion layer.

The electrochemical cell also includes a membrane electrode assembly (MEA) 12 as shown in FIGS. 11 and 12. The MEA includes a proton exchange membrane 46 that is flanked by anode 42 and cathode 44 electrodes. Each electrode is made of a porous electrode material such as carbon cloth or carbon paper. The proton exchange membrane 46, which comprises the inventive composite electrolyte, provides proton conducting medium during operation of the fuel cell. Anode current collector 30 and cathode current collector 32 are connected to external circuit 50 by leads 31, 33 respectively. The external circuit can comprise any conventional electronic device or load such as those described in U.S. Pat. Nos. 5,248,566, 5,272,017, 5,547,777, and 6,387,556, which are incorporated herein by reference. The components, mainly the MEA, can be hermetically sealed by known techniques.

In operation, fuel from fuel source 37 diffuses through the anode and an oxidizer from oxidant source 39 (e.g., container or ampoule) diffuses through the cathode of the MEA. The chemical reactions at the MEA develop the electromotive force and the electrons are transported though an electronic load. Hydrogen fuel cells use hydrogen as the fuel and oxygen as the oxidizer. For direct methanol fuel cells, the fuel is liquid methanol.

The inventive composite electrolyte can be employed in conventional fuel cells which are described, for example, in U.S. Pat. Nos. 5,248,566 and 5,547,777. In addition, several fuel cells can be connected in series by conventional means to fabricate or assemble fuel cell stacks.

Methodology

The performance enhanced crosslinked membranes of the present invention can be fabricated by reacting the designed crosslinking component with the ion-conducting base material. High boiling point solvents such as the preferred solvent, DMSO, are to be used to dissolve the reactants for the chemical reaction. Furthermore, other solvents such NMP, DMSO, DMAC, and DMF may be used. This is not meant to be an extensive list, but is meant to give the reader a sense for other solvents that can be employed. The reaction takes place in a dry atmosphere, either through azeotrophic distillation or other forms of a water free reaction conditions.

After the base material has been successfully crosslinked with the desired crosslinking component, the viscous solution is poured onto a substrate and leveled to a uniform thickness. Alternately, the mixture can also been cast by doctor blade. The resulting film is dried, removed from the substrate, and cut to size before use. Heating or applying a vacuum to the membrane while drying may also be used to facilitate evaporation.

A preferred manufacturing technique for the present invention is a tape casting method whereby the mixture of components in dispersant is poured onto a level sheet. A doctor blade moving across the gel adjusts the height to the desired thickness ranging from about 0.5 $\mu$m to about 500 $\mu$m and preferably from about 50 $\mu$m to about 300 $\mu$m. Evaporation of the solvent takes place in a controlled temperature and humidity environment. Afterwards, the membrane is removed from the substrate and conditioned for use as a proton exchange membrane. Preparation may include, but is not limited to, hydrolysis, annealing, protonating, and hydrating. Membrane preparation depends on the specific formulation of the resulting film. Although tape casting can be used for producing the membranes disclosed, other methods such as extrusion and tray casting may be employed.

In testing, the membranes are evaluated for their water uptake, proton conductivity, ion-exchange capacity and mechanical properties.

Water uptake is done via percentage uptake where:

$$\% \text{ water uptake} = (\text{Weight}_{wet} - \text{Weight}_{dry}) * 100 / (\text{Weight}_{dry})$$

For this evaluation, samples of the crosslinked membranes are dried at 100° C. in a convection oven for 24 hours and weighed for the dry weight then placed into 90° C. $dH_2O$ for 48 hour and weight for the wet weight.

For proton conductivity measurements, the evaluation is conducted with, for example, a Solartron frequency response analyzer between 1 Hz–50 kHz. The resistance at the X-intercept is taken as the resistivity then used to calculate the conductivity of the material by:

$$\text{Conductivity (S/cm)} = \text{Thickness (cm)} / (\text{resistance (ohm)} * \text{electrode area (cm}^2))$$

In measuring the ion-exchange capacity (IEC) of the material, the IEC is determined before and after the crosslinking reaction by wet chemistry method. To that end, the material is first protonated by submersion in 1N $H_2SO_4$ for 12 hours then rinsed until the rinse water is near neutral pH. The membrane is dried and weighed, then placed into 1M NaCl solution for 12 hours. The liberated $H^+$ in the solution is then titrated with standardized 0.01N NaOH solution and the IEC is calculated.

The mechanical properties of the crosslinked material are determined by testing with, for example, an Instron mechanical testing apparatus. The materials are protonated, rinsed, and left in 23° C. $dH_2O$ for 24 hours to allow for hydrolytic equilibration. The films are cut to standard size and then tested out of water, hydrated at 23° C., and submerged in water at 70° C. The mechanical properties are observed and recorded by Instron software under a pull rate of 50 mm/min.

EXPERIMENTAL

The following examples, illustrate a number of the crosslinked membrane electrolytes that are formulated and tested as a proton exchange membrane. They are not meant to encompass all possible embodiments and they merely provide the reader with a sense of the invention.

Example 1

A first example describes the process of fabricating a crosslinked electrolyte material containing an organic cation exchange material. An aromatic polymer base material, di-sulfonated poly ether ketone with a molecular weight of over 60,000 amu is fabricated as described in US Pat. App. No 2002/0091225 A1. The material's degree of sulfonation is calculated based upon the ion-exchange capacity after the material is protonated via refluxing in 0.5M sulfuric acid. The protonated polymer is then thoroughly dried under vacuum.

A crosslinking agent of phenol terminated poly-ether ketone with a molecular weight of 2500 amu is fabricated and dried similarly to the method described in US Pat. App. No. 2002/0091225 A1. The dry base polymer and crosslinking agent are then combined in a high boiling solvent such as DMSO. The solution is azeotrophically distilled with toluene in a dean-stark apparatus between 135° C. and 175° C. for four hours. The toluene is then removed and the reaction is allowed to progress for 6 hours. The resulting viscous solution is then poured onto a level plate and cast flat with a doctor blade apparatus. The solvent is allowed to evaporate at 90° C. for 12 hours followed by further drying at 130° for 12 hours and 150° C. for 12 hours. The film is then removed from the casting surface and refluxed in $H_2O$ for 1 hour. The hydrated film is then protonated for 1 hour in boiling 0.5M $H_2SO_4$ then rinsed in deionized (DI) water until the pH of the wash water is near neutral. The membrane is then tested for its physical and electrochemical performance properties and compared to the ion-conducting base material.

Example 2

A second example describes the process of fabricating a functionalized crosslinked material: A commercially available polymer material (PEEK from Victrex) is dissolved in concentrated sulfuric acid and allowed to sulfonate for a given period of time under constant temperature. The polymer is then precipitated in ice water and rinsed until the wash water is neutral and then dried under vacuum. The phenol sulfonated crosslinking agent is then synthesized by copolymerization of sulfonated difluorodiphenol ketone and bis-phenol A. The molar ratio of each monomer is used to calculate the resulting molecular weight of the crosslinking component as well as its sulfonation level. The resulting crosslinking component consisting of phenol terminated polymer chains are then rinsed and dried under vacuum.

The sulfonated polymer base material is then combined with the sulfonated crosslinking agent and dissolved in DMSO. The ratio of polymer base material to crosslinking agent is calculated such that the crosslinking agent represented between 1–50 molar percent. The reaction is azeotrophically distilled between 135° C. and 175° C. with toluene in a deanstark apparatus. The toluene is then removed at 175° C. and the reaction is allowed to continue for 8 hours. Afterwards, one or more inorganic additives may be added. The resulting mixture is then cast in a tray and allowed to evaporate at 90° C. for 12 hours followed by heating under vacuum at 135° C. for 24 hours. The dried film is then protonated in 1 M $H_2SO_4$ solution then rinsed with $dH_2O$. The membrane is then tested for its physical and electrochemical properties.

The inorganic additives can be those described in U.S. patent application Ser. No. 10/219,083 filed Aug. 13, 2002, by Taft et al. with the title "Composite Electrolyte For Fuel Cells," which is incorporated herein by reference. Specifically, an inorganic additive is selected, from the group that includes, for example, clays, zeolites, hydrous oxides, and inorganic salts. A clay includes an aluminosilicate-based exchange material selected from the group consisting of montmorillonite, kaolinite, vermiculite, smectite, hectorite, mica, bentonite, nontronite, beidellite, volkonskoite, saponite, magadite, kenyaite, zeolite, alumina, rutile.

Example 3

A third example shows that, by comparison, sulfoamide linkages are also formed via the direct crosslinking of sulfonic acid functional groups to amine terminated crosslinking agents. The crosslinking reaction may proceed identically to method detailed in Examples 1 and 2 with no changes in reaction conditions or compositions. The resulting gel may be cast in a manner as described above. The sulfoamide crosslinked membrane can then be prepared for its incorporation into a fuel cell or further physical and electrochemical tests.

Example 4

A fourth example describes the process of forming sulfoamide crosslinked material via the indirect reaction of an amine terminated crosslinking agent to a sulfonated ion conducting base material. The reaction uses the same crosslinking agents and base materials as those listed in Example 1 and Example 2. First, the sulfonated base material is protonated. The material is then dissolved into a high boiling point solvent such as n-methyl-pyrrolidinone (10 wt % solution). Stoichiometric amounts with respect to the sulfonic acid groups of the base material of Carbonyldiimidizole (CDI) is then added to the solution and allowed to react at 60° C. for 6 hours. After the intermediate reaction of sulfonic acid sites to the CDI occurs, the amine terminated crosslinking agent is then added. The stoichiometric addition of amine terminated crosslinking agent is allowed to react at 90° C. for 12 hours before the film is cast by methods similarly to that described in Example 1. The film is then dried and protonated, and ready for testing.

In summary, the present invention provides performance enhancing crosslinking agents, a method for their incorporation into ion-conducting materials, and their incorporation into a fuel cell as a high performance electrolyte membrane material. Incorporation of the crosslinking agent with the base ion-exchange material improves the physical characteristics and potentially the overall performance of the ion-exchange material for use as a proton exchange material in fuel cells. Furthermore, the crosslinking component enables the easy tailoring of low cost ion-exchange base materials into higher performing ionomers.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A method for improving the physical and mechanical properties of ion-conducting materials, comprising:
   providing an ion conducting base material;
   providing a crosslinking agent; and
   incorporating the crosslinking agent into the ion-conducting base material through hydroxyl and sulfonic acid condensation or through amine and sulfonic acid condensation.

2. A method as in claim 1, wherein the incorporation takes place in a non-aqueous environment.

3. A method as in claim 1, wherein the crosslinking agent has a chain that includes an aromatic polymer chain, an aliphatic polymer chain, an organic or inorganic polymer network, or any combination thereof.

4. A method as in claim 1, wherein, in addition to one or more of amine, hydroxyl, or sulfonic acid groups, the crosslinking agent has at least one functional group to form a covalent crosslinking bond with the ion conducting base material.

5. A method as in claim 1, wherein the ion conducting base material is an organically-based material, an inorganically-based material, or a composition thereof.

6. A method as in claim 1, wherein the ion conducting base material is organically based and containing aromatic or aliphatic structure.

7. A method as in claim 6, wherein the aromatic structure includes poly-aryl ether ketones and poly-aryl sulfones.

8. A method as in claim 6, wherein the aliphatic structure includes perflourinated or styrene co-polymer types.

9. A method as in claim 1, wherein the ion conducting base material contains one or more inorganic additives.

10. A method as in claim 9, wherein the inorganic additive is selected from the group consisting of clay, zeolite, hydrous oxide, and inorganic salt.

11. A method as in claim 10, wherein the clay includes an aluminosilicate-based exchange material selected from the group consisting of montmorillonite, kaolinite, vermiculite, smectite, hectorite, mica, bentonite, nontronite, beidellite, volkonskoite, saponite, magadite, kenyaite, zeolite, alumina, rutile.

12. A method as in claim 1, wherein the ion conducting base material has a given molecular weight and/or polymer structures with functional groups that include sulfonic acids, phosphoric acids, carboxylic acids, imidazoles, amines, and amides.

13. A method as in claim 1, wherein the crosslinking agent is hydroxyl terminated and the ion conducting base material is sulfonated, and wherein the incorporation includes direct covalent crosslinking between the hydroxyl terminated crosslinking agent and the sulfonated ion-conducting base material such that their reaction is in the form of

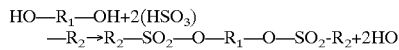
$$-R_2 \rightarrow R_2-SO_2-O-R_1-O-SO_2-R_2+2HO$$

where $R_1$ is the hydroxyl terminated crosslinking agent's main chain and $R_2$ is the sulfonated ion conducting base material.

14. A method as in claim 13, wherein the main chain includes one or more chains selected from a group consisting of an aromatic polymer chain, an aliphatic polymer chain, organic molecules and inorganic molecules.

15. A method as in claim 13, wherein the sulfonated ion conducting base material includes, one or more chains selected from a group consisting of an aromatic polymer chain, an aliphatic polymer chain, organic molecules and inorganic molecules.

16. A method as in claim 1, wherein the crosslinking agent is amine terminated and the ion conducting base material is sulfonated, and wherein the incorporation includes direct covalent crosslinking between the amine terminated crosslinking agent and the sulfonated ion-conducting base material such that their reaction is in the form of

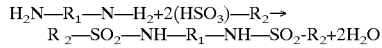
$$R_2-SO_2-NH-R_1-NH-SO_2-R_2+2H_2O$$

where $R_1$ is the amine terminated crosslinking agent's main chain and $R_2$ is the sulfonated ion conducting base material.

17. A method as in claim 1, wherein the crosslinking agent is sulfonic acid terminated and the ion conducting base material is amine or hydroxyl terminated, and wherein the incorporation includes direct covalent crosslinking between the sulfonic acid terminated crosslinking agent and the amine or hydroxyl terminated base ion-conducting material such that their reaction is in the respective form of

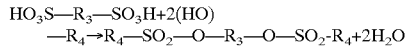
$$-R_4 \rightarrow R_4-SO_2-O-R_3-O-SO_2-R_4+2H_2O$$

or

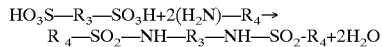
$$R_4-SO_2-NH-R_3-NH-SO_2-R_4+2H_2O$$

where $R_3$ is the sulfonic acid terminated crosslinking agent's main and $R_4$ is the amine or hydroxyl terminated ion conducting base.

18. A method as in claim 1, wherein incorporation involves a reaction solvent, including a high boiling point, non-polar solvent selected from a group consisting of dimethyl sulfoxide (DMSO), n-methyl pyrrolidinone (NMP), dimethyl acetamide (DMAC) and dimethylformamide (DMF).

19. A method as in claim 1, wherein incorporation proceeds under azeotrophic distillation via a removal of water by toluene to facilitate reaction kinetics.

20. A method as in claim 1, wherein incorporation involves 0.1% to 8% crosslinking agent's molar equivalents with respect to ion conducting base material's sulfonic acid sites.

21. A method as in claim 1, wherein incorporation involves 0.1% to 8% cross linking agent's molar equivalents with respect to ion conducting base material's amine or hydroxyl group sites.

22. A method as in claim 1, wherein the ion conducting base material contains an inorganic cation exchange material.

23. A method as in claim 22, wherein the inorganic cation exchange material is selected from a group consisting of clay, zeolite, hydrous oxide, and inorganic salt.

24. A method as in claim 22, wherein the inorganic cation exchange material further includes a silica based material and a proton conducting polymer based material.

25. A method for adding functionality to ion-conducting materials, comprising
   providing an ion conducting based material;
   providing a crosslinking agent; and
   incorporating the modified crosslinking agent into the ion-conducting base material through hydroxyl and sulfonic acid condensation or through amine and sulfonic acid condensation.

* * * * *